United States Patent [19]

Foley et al.

[11] Patent Number: 4,893,758

[45] Date of Patent: Jan. 16, 1990

[54] BREWING FUNNEL SUPPORT MEANS FOR COFFEE GRINDERS

[75] Inventors: Henry L. Foley, Chatam; Raymond Bledsoe, Springfield; James H. Anson, Auburn, all of Ill.

[73] Assignee: Bunn-O-Matic Corporation, Springfield, Ill.

[21] Appl. No.: 315,802

[22] Filed: Feb. 27, 1989

[51] Int. Cl.⁴ .............................................. A47J 42/40
[52] U.S. Cl. ................................. 241/100; 248/312.1
[58] Field of Search ....................... 99/286, 304, 306; 248/312.1, 313; 241/33, 100, 257 R, 258, 259

[56] References Cited

U.S. PATENT DOCUMENTS 4,607,200 8/1986 Zimmerman ................... 241/33 X
4,749,134 6/1988 Van Camp ........................ 241/100

Primary Examiner—Mark Rosenbaum
Attorney, Agent, or Firm—Richard Bushnell

[57] ABSTRACT

A coffee grinder adapted to discharge ground coffee directly into a brewing funnel which is readily insertable and removable from the grinder. The grinder is equipped with brewing funnel support means in the form of a pair of spring clips mounted to the grinder. The spring clips have two pairs of yieldably spreadable support elements for accommodating brewing funnels of different sizes. Thus, large size brewing funnels that would result in permanent distortion of the pair of support elements suitable for smaller funnels can be accommodated in the second pair of support elements without producing permanent distortion of the later.

6 Claims, 2 Drawing Sheets

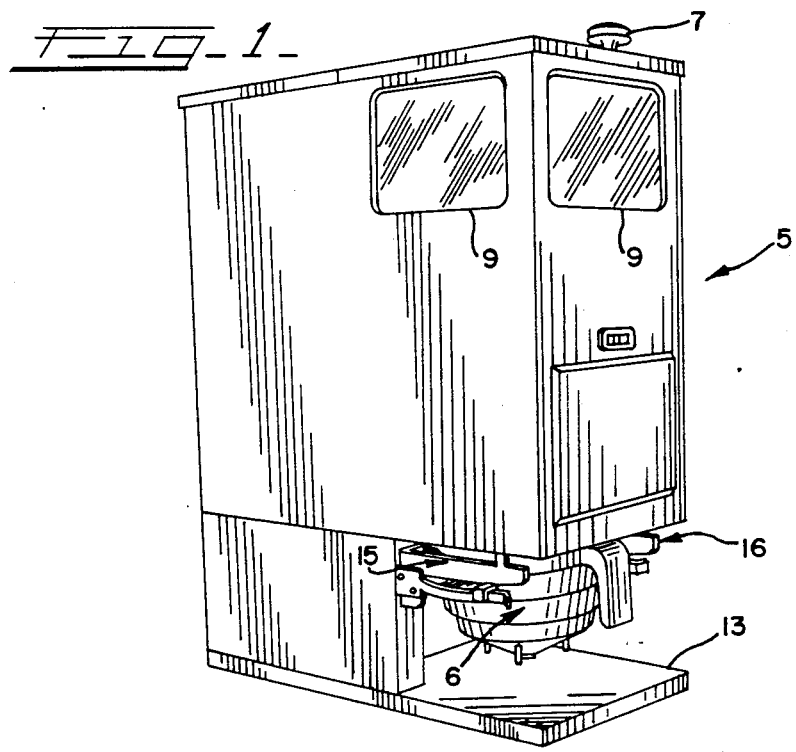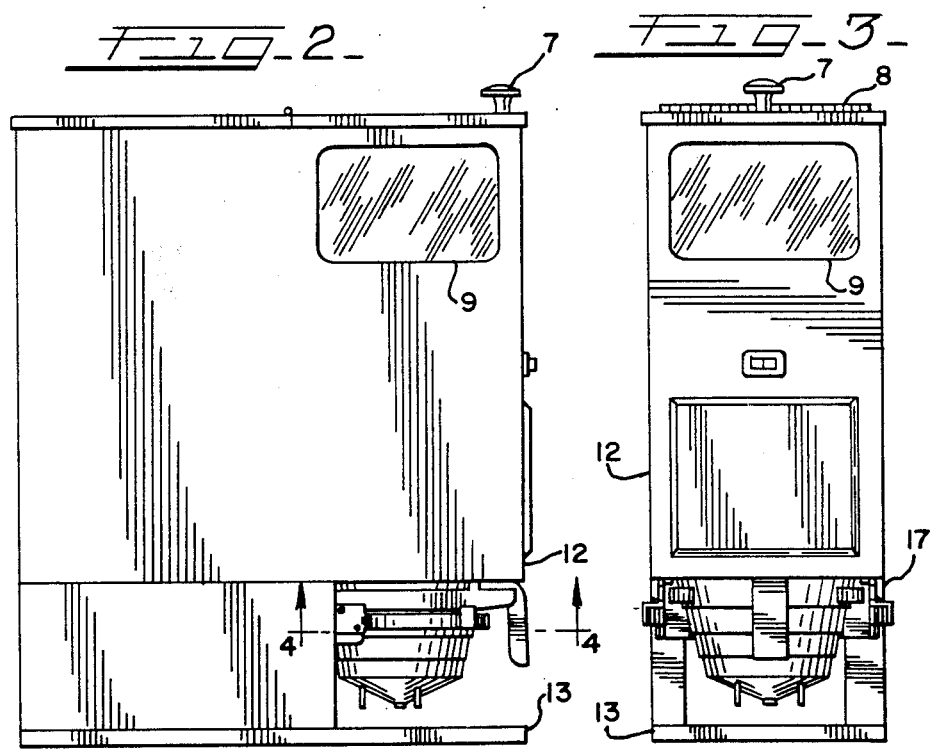

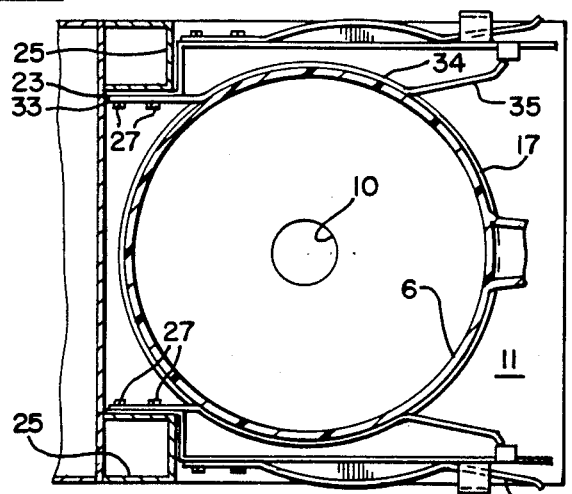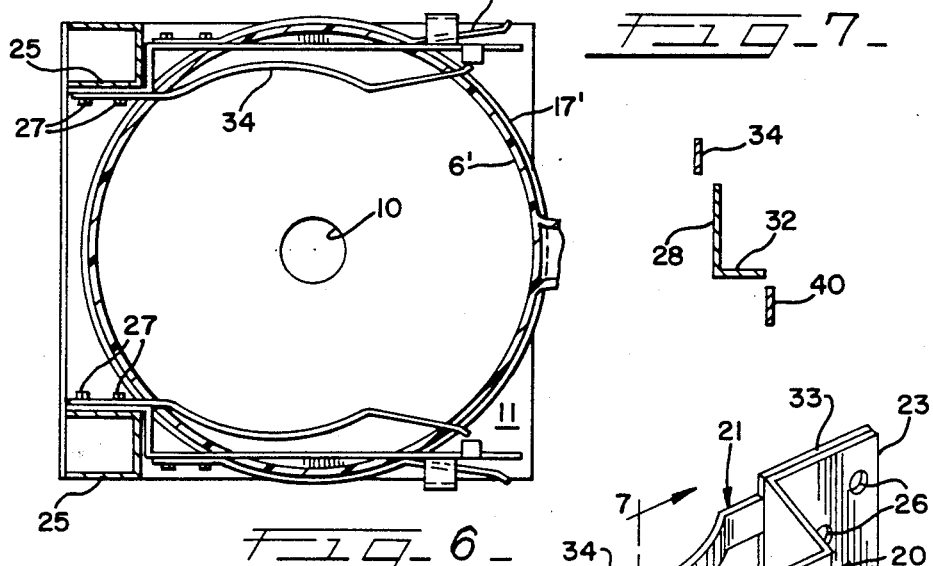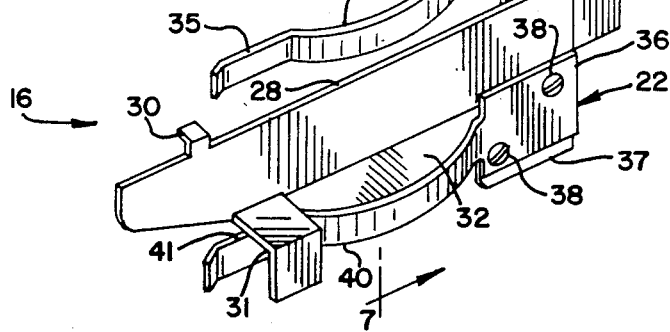

BREWING FUNNEL SUPPORT MEANS FOR COFFEE GRINDERS

This invention relates generally to means for releasably supporting brewing funnels of a relatively wide range of sizes on a coffee grinder in such a position thereon as to have ground coffee for brewing a batch of coffee discharged directly into the brewing funnels.

Coffee making machines of the type wherein a disposable filter is inserted into a brewing funnel, ground coffee is loaded into the brewing funnel onto the filter, and the brewing funnel is inserted into the coffee making machine wherein hot water is sprayed over the coffee in the funnel and the brewed coffee is collected in a container under the funnel, a well known and widespread use. In recent years, the practice of making coffee with freshly ground coffee beans has become popular and coffee grinders are available which are adapted to grind coffee beans into batches of ground coffee of the sizes suitable for the brewing funnels of coffee machines used in restaurants, offices, homes, etc.

Instead of collecting a batch of ground coffee in a separate container during grinding and then transferring it from that container into a filter-lined brewing funnel, it is desirable for convenience and other reasons to collect the batch of ground coffee directly into the brewing funnel onto the filter placed therein. As a practical matter, because of the various sizes and shapes of the brewing funnels that are used and the various configurations and the thicknesses of the supporting flanges customarily located at the rims of the funnels, there has been a problem in releasably supporting the brewing funnels on coffee grinders so as to receive ground batches of coffee therein. This problem has been solved in a practical way in accordance with the brewing funnel support means disclosed in Van Camp Pat. No. 4,749,134 dated June 7, 1988 assigned to the assignee of the present application and invention and the disclosure of which is incorporated by reference herein. However, in practice it was found that the brewing funnel support means disclosed in Pat. No. 4,749,134 which accommodated a substantial range of brewing funnel sizes and shapes were not fully adequate for supporting the largest sized brewing funnels such as those used in connection with coffee urns. These larger sized brewing funnels were found to be too large to be inserted into the brewing funnel support means on the grinders and even if they could be inserted they were found to produce a permanent distortion of the resiliently spreadable support elements so that these elements did not return to their normal positions so as to be satisfactorily functional in supporting brewing funnels in the smaller ranges of sizes.

Having the foregoing problem of the prior art brewing funnel support means for coffee grinders in mind, the object of the present invention, generally stated, is the provision of brewing funnel support means for coffee grinders which will accommodate brewing funnels of the full range of sizes commonly encountered without producing permanent injury or damage or impairing the normal support functions of which such funnel support means were designed to have and of which they were capable.

An important object of the invention is the provision of brewing funnel support means for coffee grinders comprising a pair of spaced-apart spring clip members having proximal ends rigidly mounted on the coffee grinder below an overhanging portion thereof which has a ground coffee discharge opening in the underside with the spring clips adapted to have supporting engagement on opposite sides of inserted brewing funnels underneath the lateral flanges provided on the rims of the funnels and with the spring clips being bifurcated and providing at least two pair of funnel support branches or elements with one pair adapted to support brewing funnels of a smaller range of sizes and another pair adapted to support brewing funnels of a larger range of sizes.

A further object of the invention is the provision of brewing funnel support means for coffee grinders having brewing support elements for supporting brewing funnels of a relatively wide range of sizes with one pair of support elements for supporting brewing funnels in a smaller range of sizes and another pair of funnel support elements for supporting substantially larger brewing funnels with guide means incorporated for preventing the larger sized brewing funnels from becoming inadvertently inserted into the support elements for the smaller sized brewing funnels.

Still another object of the invention is the provision of brewing funnel support means of the foregoing type incorporating means which prevent insertion of oversized brewing funnels that might result in permanent distortion or damage to the brewing funnel support means.

Certain other objects of the invention will appear hereinafter in connection with the following detailed description of the preferred embodiments of the invention taken in connection with the accompanying drawings wherein:

FIG. 1 is a perspective view of the coffee grinder with a brewing funnel supported in place thereon by support means forming one embodiment of the present invention;

FIG. 2 is a left side elevational view of the coffee grinder shown in FIG. 1;

FIG. 3 is a front elevational view of the coffee grinder and funnel shown in FIG. 1;

FIG. 4 is a view on enlarged scale taken on line 4—4 of FIG. 2;

FIG. 5 is a view corresponding to FIG. 4 but showing a larger sized brewing funnel being supported by a different sized pair of funnel support elements; and FIG. 6 is a perspective view of one of the pair of spring clips forming the funnel support means of FIGS. 1-5.

FIG. 7 is a view taken on line 7—7 of FIG. 6.

In FIGS. 1-3 a coffee bean grinder is indicated generally at 5 having inserted in place thereon a brewing funnel indicated generally at 6. The coffee grinder 5 may be of known commercial type and the details of construction thereof do not form part of the present invention. Likewise, the brewing funnel 6 may be of known commercial type such as used in known commercial coffee brewers or urns. For example, the coffee grinder 5 may be of the construction shown in above-mentioned U.S. Pat. No. 4,749,134 and the brewing funnel 6 may be of the construction shown in U.S. Pat. No. 3,374,897 to John C. Martin, dated Mar. 26, 1968, both patents being assigned to the assignee of the present invention and application and the disclosures of which are incorporated by reference herein.

The grinder 5 can be loaded with coffee beans from the top by lifting the handle 7 on the door 8 opening into the bean hopper which is provided with windows 9 through which the quantity of beans remaining to be ground may be viewed. The grinder mechanism disposed within the body of the grinder 5 below the bean hopper discharges ground coffee through an opening 10 (FIGS. 4 and 5) in the plate 11 forming the underside of the portion 12 of the grinder that overhangs the platform 13.

It will be noted from FIGS. 1–3 that the brewing funnel 6 is supported underneath the overhanging portion 12 by a pair of spring clips indicated generally at 15 and 16. The upper portion of the brewing funnel 6 fits in between the cantilevered spring clips 15 and 16 which provide funnel supporting engagement from opposite sides of the funnel underneath the funnel flange 17 (FIGS. 3 and 4) extending laterally around the rim of funnel 6.

For a detailed description of the spring clips 15 and 16, reference may be had to FIGS. 4–6 it being pointed out that the spring clip 15 is left handed whereas the spring clip 16 is right handed. Each spring clip is formed in three separate parts comprising a guide and mounting member 20, an upper support branch or element 21, and a lower support branch or element 22.

The funnel guide and clip mounting member 20 is formed with a right angular mounting formation comprising legs 23 and 24 which fit and mate with rigid support elements 25 (FIGS. 4 and 5) forming parts of the structure of the grinder 5. The rear leg 23 is provided with apertures 26—26 through which pairs of retaining screws 27—27 (FIG. 4) may be inserted for rigidly securing each spring clip 16 to its respective support 25.

Extending forwardly from the transverse leg 24, the member 20 has a guide element 28 which is relatively wide from top to bottom so as to be relatively nonyielding. Adjacent its distal end, the mounting element 20 is provided at the top with a formation 30 and at the bottom with a formation 31, the purposes and functions of which will be mentioned below. On its underside, the guide and mounting member 20 is also provided with a laterally extending arcuate-shaped extension 32 (FIGS. 6 and 7) which serves as a chaff shield to prevent chaff formed during the grinding operation from entering larger sized funnels which will be supported at a greater distance from the underside 11 of the grinder than the relatively short distance between smaller sized funnels and the underside surface 11.

The upper funnel support element or branch 21 has at its proximal or rear end an attaching formation 33 which fits over the leg 23 of the guide and mounting element 20 and is secured to the element 20 as well as to the rigid part 25 of the grinder by means of the abovementioned pair of screws 27.

Forwardly or outwardly from its distal end 33, the support element 21 has an arcuate funnel engaging section 34 on the top edge of which the underside of the funnel flange 17 rests when the funnel 6 is in its fully inserted position on the grinder 5. Outwardly of the arcuate section 34, the distal end 35 is bent outwardly so as to facilitate the entry or insertion of the brewing funnel into its place on the grinder 5.

A lower or bottom funnel support member or branch 22 has at its proximal end an attaching formation 36 by mean of which it may be secured to the support 37 integrally extending downwardly from the guide and mounting element 20 by means of screws 38—38. Outwardly or forwardly from the proximal end, the element 22 has an arcuate funnel engaging and support portion 40 on the top edge of which a rim 17' (FIG. 5) of a larger sized brewing funnel 6' when the larger funnel is fully inserted in place on the grinder 5. The distal end 41 of the funnel engaging element 22 is outwardly bent or flared to facilitate the insertion of larger sized funnels onto the grinder 5.

It will be seen that the spring clip 16 and its cooperating left hand spring clip 15 are characterized as being "bifurcated" in that from the proximal end of each spring clip a pair of upper and lower funnel engaging and support elements (21 and 22 in the case of spring clip 16) extend. Each upper branch or element 21 constitutes one of a cooperating pair of funnel supports and each lower funnel support element 22 constitutes with its counterpart a lower pair of funnel supports. Each pair is yieldably outwardly spreadable so as to permit the insertion of a round or circular brewing funnel with which the arcuate portions 34 or 40 will fit with reasonable closeness while providing support engagement with the rims of the respective brewing funnels. A yieldable character of the pairs of funnel supports may be obtained by forming the elements 21 and 22 of suitable spring stock. It will be understood that these elements could also be formed of rigid non-yielding material and then pivotally mounted at their proximal ends with spring means biasing each pair of funnel engaging portions toward each other.

From the foregoing description in connection with the accompanying drawings it will be apparent that the operator will, of necessity, insert brewing funnels having a size within the smaller range so as to be supported by the upper funnel support elements 21 and its counterpart on spring clip 15. Thus, the smaller sized funnel such as 6 are too small to receive support from the lower funnel support members 22 and its counterpart on spring clip 15.

When an operator seeks to insert a funnel of larger size such as 6' onto the brewer 5, the spring clip guide and mounting member 20 and its counterpart on spring clip 15 will block insertion of a larger funnel into the upper spring clips since the diameter of the larger sized funnels will not be accepted between the guide portions 28 and its counterpart. The operator will thus realize that the larger funnel will need to be inserted between the lower funnel support elements 22 and its counterpart.

The insertion of oversized or outsized brewing funnels that might result in permanent damage or distortion of the lower support elements will be prevented by the downwardly extending ends of the formations 31 being engaged by the outwardly bent distal ends 41 and its counterpart.

What is claimed is:

1. In combination with a coffee-grinder having a downwardly discharging ground coffee outlet in a horizontal underside surface of an overhanging portion of said grinder, means for releasably supporting one at a time brewing funnels which are non-uniform in respect to size and shape each having a rim and support flange at its rim in insertable and removable relationship with respect to said grinder comprising:

a pair of bifurcated spring clips each clip having a proximal end and a distal end on each of its branches and including mounting means on its proximal end mounted to said grinder so that said spring clips extend in cantilever manner and brewing funnel support relationship beneath said horizontal underside surface, each said branch being one of a cooperating pair and each said pair of branches being vertically spaced with respect to each adjacent pair, said pairs of branches having different sizes for supporting brewing funnels having sizes falling in different respective size ranges, the brewing funnel engaging portions of said spring clips being spaced sufficiently below said horizontal underside surface so as to accommodate between said surface and said clips said flange on the rim of a supported brewing funnel, each said branch having an arcuate formation between its distal and proximal ends which formation supportingly engages an inserted brewing funnel and each said pair of clips being sufficiently yieldably spreadable without appreciable permanent distortion to permit insertion of a brewing funnel having a size in its said respective size range.

2. The combination of claim 1, wherein the distal ends of each of said pairs of branches are bent outwardly to facilitate insertion of a brewing funnel.

3. The combination of claim 1, wherein there are two of said vertically spaced pairs of branches and the upper pair is smaller than the lower.

4. The combination of claim 3, wherein each of said bifurcated spring clips includes a relatively non-yieldable guide member extending vertically and horizontally intermediate said pair of branches thereon, said guide members in each said pair of spring clips serving to block insertion of an over-sized brewing funnel into said smaller pair of branches.

5. The combination of claim 4, wherein each said guide member has an outwardly and downwardly extending hook formation which is engageable by said lower branch in each said pair and prevents excessive spreading of said lower branches.

6. The combination of claim 4, wherein the proximal end of each said guide member is mounted to said grinder and the proximal end of each of said branches is mounted to said guide member of its bifurcated spring clips.

* * * * *